US011086611B2

(12) United States Patent
Yu et al.

(10) Patent No.: US 11,086,611 B2
(45) Date of Patent: Aug. 10, 2021

(54) METHOD, DEVICE, AND SYSTEM FOR TRANSMITTING PROGRAM AND PARAMETER TO PLC

(71) Applicant: OMRON CORPORATION, Kyoto (JP)

(72) Inventors: Haibin Yu, Shanghai (CN); Peng Guan, Shanghai (CN)

(73) Assignee: OMRON CORPORATION, Kyoto (JP)

(*) Notice: Subject to any disclaimer, the term of this patent is extended or adjusted under 35 U.S.C. 154(b) by 48 days.

(21) Appl. No.: 16/465,581

(22) PCT Filed: Oct. 26, 2017

(86) PCT No.: PCT/JP2017/038751
§ 371 (c)(1),
(2) Date: May 31, 2019

(87) PCT Pub. No.: WO2018/123241
PCT Pub. Date: Jul. 5, 2018

(65) Prior Publication Data

US 2019/0310841 A1 Oct. 10, 2019

(30) Foreign Application Priority Data

Dec. 28, 2016 (CN) ......................... 201611234273.8

(51) Int. Cl.
*G06F 8/65* (2018.01)
*G05B 19/05* (2006.01)
*H04L 29/08* (2006.01)

(52) U.S. Cl.
CPC ............... *G06F 8/65* (2013.01); *G05B 19/05* (2013.01); *G05B 19/056* (2013.01); *H04L 67/10* (2013.01);

(Continued)

(58) Field of Classification Search
CPC ......... G06F 8/65; G05B 19/05; G05B 19/056; G05B 2219/13004; H04L 67/10; H04L 67/14

(Continued)

(56) References Cited

U.S. PATENT DOCUMENTS

2003/0177440 A1 9/2003 Kegoya et al.
2006/0179120 A1 8/2006 Kegoya et al.

(Continued)

FOREIGN PATENT DOCUMENTS

CN 103337150 A 10/2013
CN 104272204 A 1/2015

(Continued)

OTHER PUBLICATIONS

Stephen McLaughlin et al., "SABOT: Specification-based Payload Generation for Programmable Logic Controllers", pp. 43-449, [ Retrieved from Internet on May 12, 2021], <https://dl.acm.org/doi/pdf/10.1145/2382196.2382244>, (Year: 2012).*

(Continued)

*Primary Examiner* — Ziaul A Chowdhury
(74) *Attorney, Agent, or Firm* — Metrolex IP Law Group, PLLC

(57) ABSTRACT

The present invention relates to a method, device, and system for transmitting a program and parameter to a PLC. An adapter connecting to a port of a PLC allows an operator to simply (i) log in on a cloud server with use of a mobile terminal on which an APP is installed, (ii) download a written program or parameter, and (iii) transmit the program or parameter directly to the adapter wirelessly to transmit the program or parameter to the PLC via the adapter. An alternative embodiment may be arranged such that the cloud server transmits, to an APP of the mobile terminal over a mobile network, an instruction on what data to sample and (Continued)

that the APP accesses the PLC via the adapter, obtains the data, and feeds back the data to the cloud server. This simplifies the operation for updating and maintaining a program and/or parameter of a PLC and reduces costs.

8 Claims, 5 Drawing Sheets

(52) U.S. Cl.
CPC .... *H04L 67/14* (2013.01); *G05B 2219/13004* (2013.01)

(58) Field of Classification Search
USPC .......................................................... 717/130
See application file for complete search history.

(56) References Cited

U.S. PATENT DOCUMENTS

2006/0179121 A1 8/2006 Kegoya et al.
2006/0190624 A1 8/2006 Kegoya et al.
2007/0079355 A1* 4/2007 Chand .................. G05B 19/054 726/2
2008/0192812 A1* 8/2008 Naeve .................... G01D 21/00 375/222
2010/0049871 A1* 2/2010 Webster .............. G06F 11/2033 709/245
2010/0103941 A1* 4/2010 Jiang ................... H04L 12/2825 370/400
2011/0317603 A1* 12/2011 Ruiz Lopez ............. H04B 3/54 370/311
2014/0172121 A1 6/2014 Li et al.
2015/0066979 A1 3/2015 Zhang et al.
2015/0127821 A1 5/2015 Kawanoue et al.
2015/0192918 A1* 7/2015 Obermeier ......... G05B 19/0426 700/87
2015/0334164 A1 11/2015 Crawford et al.
2017/0018899 A1* 1/2017 Utermoehle ....... H01R 13/5812
2017/0134212 A1 5/2017 Sakakura

FOREIGN PATENT DOCUMENTS

CN 106125662 A 11/2016
DE 112014006483 T5 12/2016
EP 2418807 A1 2/2012
EP 2660667 A2 11/2013
GB 2339940 A 2/2000
JP H11-112676 A 4/1999
JP 2001-282323 A 10/2001
JP 2002-108731 A 4/2002
JP 2010-022655 A 2/2010
JP 2012-113408 A 6/2012
JP 2015-090548 A 5/2015
JP 2016-507809 A 3/2016

OTHER PUBLICATIONS

Richa Nettoet al., “Programmable Logic Controllers”, [Online], pp. 27-31. [Retrieved from Internet on May 16, 2021], <https://citeseerx.ist.psu.edu/viewdoc/download?doi=10.1.1.403.3792&rep=rep1&type=pdf>, (Year: 2013).*
Syifaul Fuada et al., “A Study Basic Programmble Logic Ccontroller (PLC) For Effective Learning”, [Online], pp. 470-473, [ Retrieved from Internet on May 16, 2021], <https://citeseerx.ist.psu.edu/viewdoc/download?doi=10.1.1.299.8843&rep=rep1&type=pdf>, (Year: 2012).*
English translation of the International Search Report (“ISR”) of PCT/JP2017/038751 dated Jan. 30, 2018.
Written Opinion (“WO”) of the International Searching Authority of PCT/JP2017/038751 dated Jan. 30, 2018.
Chinese Office Action (CNOA) dated May 6, 2020 in a counterpart Chinese patent application.
Extended European search report (EESR) dated Feb. 25, 2020 in a counterpart European paten application.

* cited by examiner

METHOD, DEVICE, AND SYSTEM FOR TRANSMITTING PROGRAM AND PARAMETER TO PLC

TECHNICAL FIELD

The present invention relates to the field of programmable logic controllers (PLCs), and in particular, to a method, a device, and a system for transmitting a program and parameter to a PLC.

BACKGROUND ART

A control system for controlling mass-produced equipment and a device, for example, a vehicle control system and a device control system for an electric charging pole or the like, includes a small-sized, low-cost PLC having only limited functions and having no networking function. There is a need to update a program or parameter of such a PLC as appropriate for maintenance, and to regularly collect monitoring data sampled by the PLC and compile statistics from such monitoring data.

Conventional methods for transmitting a program and parameter to a PLC are classified into two types: local operation and remote operation. A local operation is carried out, for instance, such that dedicated PLC programming software installed on a computer is used to transmit a program and/or parameter for the PLC to the PLC via (i) a universal serial bus (USB) or serial port as a wired connection or (ii) an interface such as the Ethernet (registered trademark). Another example involves (i) transmitting a program and/or parameter for a PLC to a memory card such as a secure digital memory card (abbreviation: SD card) and a multi-media card (abbreviation: MMC card) with use of a computer, (ii) inserting the memory card into the PLC, and finally (iii) an operator connecting the PLC to an electric power source and turning the PLC on to transmit a program and/or parameter to the PLC. A remote operation is carried out such that for a PLC with the function of remote connection, for example, a parameter and program are remotely set and rewritten through a virtual communication channel remotely established with use of PLC programming software over a network such as a network based on the General Packet Radio Service (GPRS). Another example involves (i) using an application program (abbreviation: APP) installed on a mobile telephone to store a program and/or parameter for each target device in the mobile telephone and (ii) downloading the program and/or parameter into the PLC with use of, for example, the On-the-Go (OTG) function or a network line.

The above discussion of related art serves to solely provide a clear and sufficient description of the technical features of the present invention and allow a person skilled in the art to easily understand the present invention. Thus, the technical features should not be construed as being known to a person skilled in the art for the mere reason that the above discussion is provided under "Background Art" for the present invention.

SUMMARY OF INVENTION

Technical Problem

As described above, there has been an issue of how to simplify the form of operation to be carried out by a local operator.

Solution to Problem

In order to solve the issue involved with the background art, embodiments of the present invention provide a method, device, and system for transmitting a program and parameter to a PLC which method, device, and system for the transmission simplify the form of operation for updating and maintenance of a program and/or parameter of a PLC to reduce costs of a device control system.

A first aspect of an embodiment of the present invention is a method for transmitting a program and parameter to a programmable logic controller (PLC) which method is for use in an adapter, the method including the steps of:

the adapter establishing a connection with the PLC and a connection with a mobile terminal;

the adapter reading a state of the PLC from the PLC;

the adapter transmitting data on the state of the PLC to the mobile terminal;

the adapter receiving a program and/or parameter that the mobile terminal has downloaded from a cloud server and that corresponds to the state of the PLC; and the adapter transmitting the program and/or parameter to the PLC.

A second aspect of an embodiment of the present invention is an adapter including:

a first communication module configured to establish a wired connection with a programmable logic controller (PLC);

a second communication module configured to establish a wireless connection with a mobile terminal;

a storage module configured to store in advance a protocol list, a port list, and a port setting list for establishment of the wired connection with the PLC;

an input-output module configured to (i) receive an input from an external device to the adapter and (ii) output data to an external device; and a microcontroller configured to control the first communication module, the second communication module, the storage module, and the input-output module, the controlling including:

a task of controlling (i) the first communication module so that the first communication module establishes a connection with the PLC and (ii) the second communication module so that the second communication module establishes a connection with the mobile terminal, a task of controlling the first communication module so that the first communication module reads a state of the PLC from the PLC, a task of controlling the second communication module so that the second communication module transmits data on the state of the PLC to the mobile terminal, a task of controlling the second communication module so that the second communication module receives a program and/or parameter that the mobile terminal has downloaded from a cloud server and that corresponds to the state of the PLC, and a task of controlling the first communication module so that the first communication module transmits the program and/or parameter to the PLC.

A third aspect of an embodiment of the present invention is a system including: a cloud server; a mobile terminal; an adapter; and a programmable logic controller (PLC), the system being configured to transmit a program and parameter to the PLC, the cloud server storing: information on a plurality of PLCs to one of which each of a plurality of registered users corresponds; and (i) a plurality of programs to one of which each of the plurality of PLCs corresponds, (ii) a plurality of parameters to one of which each of the plurality of PLCs corresponds, and/or (iii) a plurality of pieces of uploaded monitoring data to one of which each of the plurality of PLCs corresponds, the mobile terminal being configured to (i) connect to the cloud server over a wireless network and connect to the adapter over a near-field wireless network, and (ii) on a basis of a state of said PLC on which state data has been transmitted from the adapter, obtain, from the cloud server, a program and/or parameter corresponding to the state of said PLC, the adapter being configured to (i) connect to said PLC over a wired network, (ii) read the state of said PLC from said PLC and transmit the data on the state of said PLC to the mobile terminal, and (iii) receive the program and/or parameter from the mobile terminal and transmit the program and/or parameter to said PLC, said PLC being configured to (i) sample data and (ii) transmit the sampled data to the cloud server via the adapter and the mobile terminal.

Advantageous Effects of Invention

With a method, device, and system as embodiments of the present embodiment, the adapter connecting to a related port of the PLC advantageously allows an operator to simply (i) log in on the cloud server with use of a mobile terminal on which the APP is installed, (ii) download a corresponding, written program or parameter, and (iii) send the program or parameter directly to the adapter wirelessly to transmit the program or parameter to the PLC via the adapter. An alternative embodiment may be arranged such that the cloud server transmits, to an APP of the mobile terminal over a mobile network, an instruction on what data to sample and that the APP on the mobile terminal accesses the PLC via the adapter, obtains the data, and feeds back the data to the cloud server. This advantageously simplifies the form of operation for updating and maintaining a program and/or parameter of a PLC and reduces costs.

DESCRIPTION OF EMBODIMENTS

The above and other features of the present invention will be clear from the descriptions below that refer to the drawings. The particular embodiments of the present invention that are disclosed in detail in this specification and the drawings illustrate some embodiments based on the principle of the present invention, and do not serve to limit the present invention. The present invention should rather be construed as including all alterations, modifications, and equivalents thereof within the scope of the attached claims.

The attached drawings contribute to further understanding of embodiments of the present invention, and are part of the specification. The drawings illustrate example embodiments of the present invention, and show the principle of the present invention together with the literal expressions. The drawings are, needless to say, merely representatives of some embodiments of the present invention. A person skilled in the art will be able to arrive at another drawing on the basis of the drawings on the assumption that no creative efforts are needed.

Embodiment 1

Figure 1:
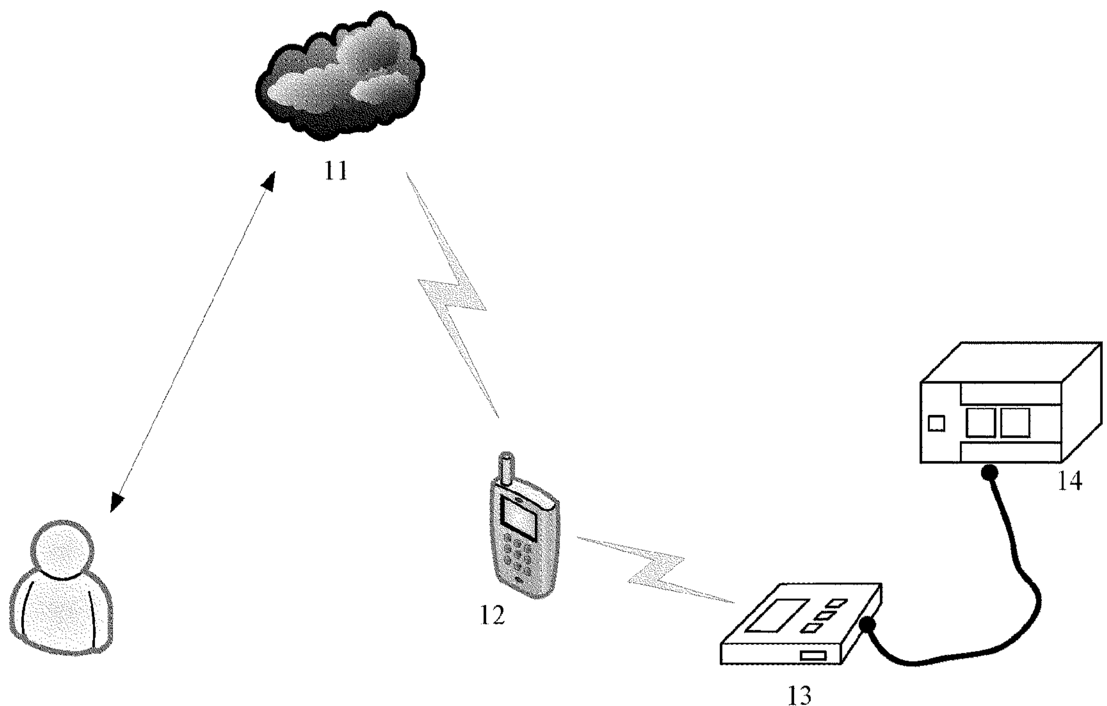
FIG. 1 is a diagram schematically illustrating a system of Embodiment 1 configured to transmit a program and parameter to a PLC.

The present embodiment provides a system for transmitting a program and parameter to a programmable logic controller (PLC). FIG. 1 is a diagram schematically illustrating the system. As illustrated in FIG. 1, the system includes a cloud server 11, a mobile terminal 12, an adapter 13, and a PLC 14. The cloud server 11 stores (i) information on PLCs to one of which each registered user corresponds and (ii) programs to one of which each PLC corresponds, parameters to one of which each PLC corresponds, and/or pieces of uploaded monitoring data to one of which each PLC corresponds. The mobile terminal 12 is configured to connect to the cloud server 11 over a wireless network and also to the adapter 13 over a near-field wireless network. The mobile terminal 12 is further configured to, on the basis of the state of the PLC 14 on which state data has been transmitted from the adapter 13, (i) obtain from the cloud server 11 a program and/or parameter corresponding to the state of the PLC 14 and (ii) transmit the program and/or parameter to the adapter 13. The adapter 13 is configured to connect to the PLC 14 over a wired network. The adapter 13 is configured to then (i) read the state of the PLC 14 from the PLC 14 and transmit data on the state of the PLC 14 to the mobile terminal 12 and also (ii) receive the program and/or parameter from the mobile terminal 12 and transmit the program and/or parameter to the PLC 14. The PLC 14 is configured to sample data and provide the sampled data to the cloud server 11 via the adapter 13 and the mobile terminal 12.

With the system of the present embodiment, the adapter connecting to a related port of the PLC allows an operator to simply (i) log in on the cloud server with use of a mobile terminal on which the APP is installed, (ii) download a corresponding, written program or parameter, and (iii) send the program or parameter directly to the adapter wirelessly to transmit the program or parameter to the PLC via the adapter. This simplifies the form of operation for updating and maintaining a program and/or parameter of a PLC and reduces costs.

The far-field cloud server 11 of the present embodiment stores, for each registered user, data such as programs, parameters, or downloadable monitoring data for various PLC devices under the exclusive name of the user's. The cloud server 11 allows the mobile terminal 12 to serve simply as a communications relay device when connected to the PLC 14; actual data, parameters, and the like are all stored on the cloud server 11. This eliminates the need for the mobile terminal 12 to store all programs and parameters. The operator can simply obtain data on the state of the PLC 14 via the mobile terminal 12 and the adapter 13 and then obtain from the cloud server 11 a dedicated program and parameter for the PLC 14. The cloud server 11 allows the operator to simply own a mobile terminal 12, install the corresponding APP, and obtain an authorized user name and password to maintain a PLC.

The present embodiment may be arranged to allow an engineer to access the cloud server 11 over a wired or wireless network and upload and download related data onto and from the cloud server so that the engineer and the operator can carry out respective operations simultaneously.

The present embodiment is arranged such that a dedicated APP has been installed on the mobile terminal 12 and that the use of the dedicated APP makes it possible to connect wirelessly to the adapter 13 and obtain data on the state of the PLC 14 from the adapter 13. The present embodiment may be arranged such that the dedicated APP (i) connects to the cloud server 11 with use of, for example, an account and a mobile network (for example, a 2G, 3G, 4G, or 5G network), (ii) downloads from the cloud server 11 data prepared in advance such as a program and/or parameter for the PLC onto the mobile terminal 12 on which the dedicated APP runs, and subsequently (iii) downloads the data onto the PLC 14 via the adapter 13, to which the mobile terminal 12 is connected wirelessly.

The present embodiment may be arranged such that the mobile terminal 12 and the adapter 13 are connected to each other on the basis of a dedicated communications protocol such as Wi-Fi (Wireless-Fidelity; registered trademark) and Bluetooth (BT; registered trademark).

Figure 2:
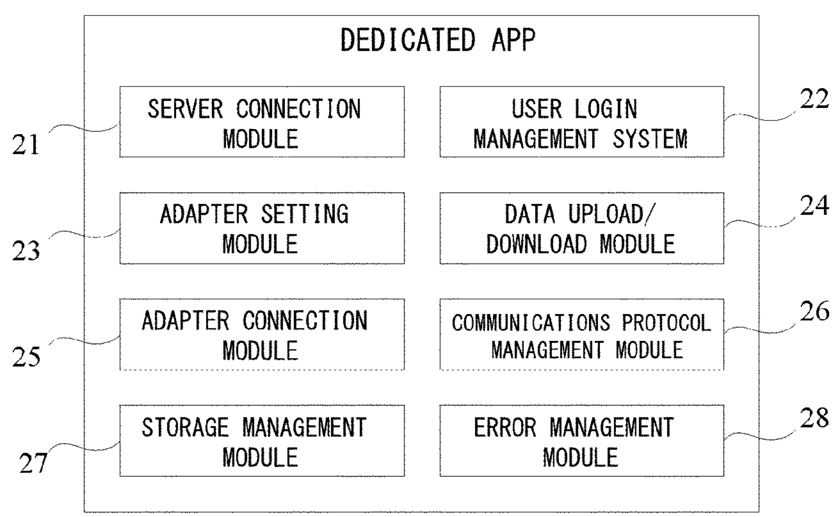
FIG. 2 is a diagram schematically illustrating what is managed by a dedicated APP installed on a mobile terminal in a system of Embodiment 1.

FIG. 2 is a diagram schematically illustrating what is managed by the dedicated APP installed on the mobile terminal 12. The dedicated APP, as illustrated in FIG. 2, includes a server connection module 21, a user login management system 22, an adapter setting module 23, a data upload/download module 24, an adapter connection module 25, a communications protocol management module 26, a storage management module 27, and an error management module 28.

The server connection module 21 is configured to manage connection with the cloud server 11. The user login management system 22 is configured to manage log-in by the user. The adapter setting module 23 is configured to manage settings for the adapter 13 such as a communications protocol setting for a port. The data upload/download module 24 is configured to manage data sampled by the PLC 14 which data is to be uploaded to the cloud server 11. The adapter connection module 25 is configured to manage connection with the adapter 13. The communications protocol management module 26 is configured to manage communication with the cloud server 11 and the adapter 13. The storage management module 27 is configured to manage data stored. The error management module 28 is configured to manage various possible errors such as a communication error, a connection error, a data uploading error, and a data downloading error. For the present embodiment, the system and embodiment of the dedicated APP are not particularly limited. Any system or embodiment that is capable of carrying out one or more of the above functions is within the protection scope of the present invention.

Figure 3:
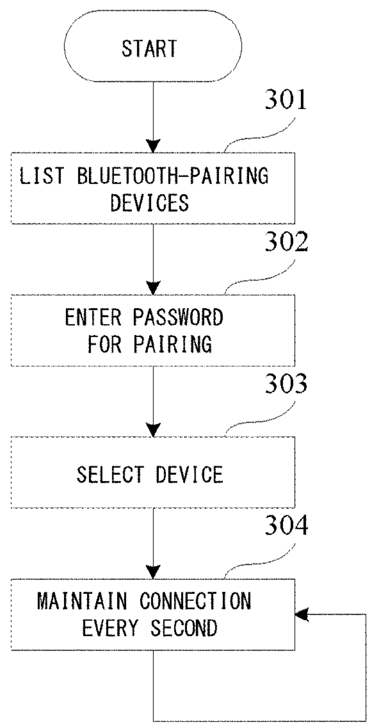
FIG. 3 is a flowchart illustrating how a mobile device establishes a wireless connection with an adapter in a system of Embodiment 1.

FIG. 3 is a flowchart illustrating how the mobile terminal 12 and the adapter 13 are connected to each other. As illustrated in FIG. 3, the procedure includes a step 301 of listing Bluetooth-pairing devices, a step 302 of entering a pairing password, a step 303 of selecting a device, and a step 304 of maintaining the connection every second.

The connection procedure illustrated in FIG. 3 is a mere example of how a connection between the mobile terminal 12 and the adapter 13 is established. The present embodiment is not limited by the example. The protection scope of the present invention covers any other possible connection method.

The present embodiment may be arranged such that the adapter 13 is connected to the PLC 14 by an existing connection method, for example, via a serial port or a universal serial bus (USB). Further, the adapter 13 may update, for example, a program and/or parameter of the PLC 14 on the basis of a communications protocol exclusive to the PLC.

The present embodiment may be arranged such that the adapter 13 is charged with use of a battery. This eliminates the need to charge the adapter 13 with use of a separate means. The present embodiment is, however, not limited to such an arrangement. The adapter 13 may be charged by an external electric power source. Further, the adapter 13 may be configured to (i) read the state of the PLC 14 from the PLC 14, (ii) convert the data on the state of the PLC 14 into data that a dedicated APP on the mobile terminal 12 is capable of recognizing, and (ii) transmit the converted data to the mobile terminal 12. The adapter 13 may also be configured to (i) receive a PLC program and/or parameter corresponding to the state of the PLC which program and/or parameter has been transmitted by the cloud server 11 through a dedicated APP on the mobile terminal 12, (ii) convert the program and/or parameter into data that conforms to a PLC telecommunications standard, and (iii) transmit the converted data to the PLC 14.

For the present embodiment, the state of the PLC 14 includes one or more of such pieces of information as the name, type, program version, parameter version, and user number of the PLC.

The adapter 13 of the present embodiment may be configured to, when connected to the PLC 14 via a cable, access the PLC 14 on the basis of settings or a method of automatic selection.

Figure 4:
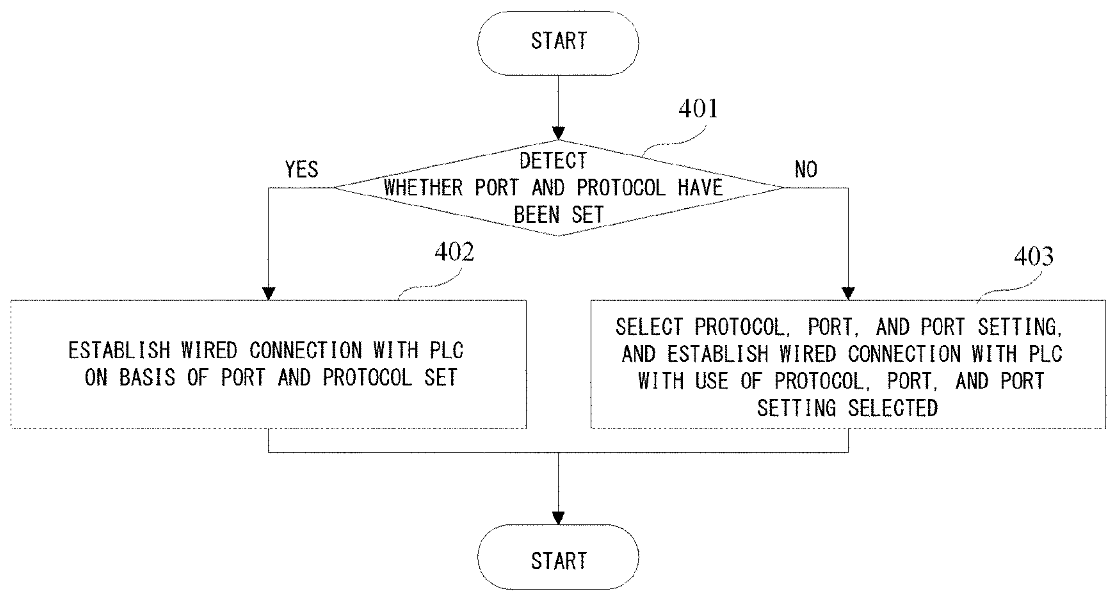
FIG. 4 is a flowchart illustrating how an adapter establishes a connection with a PLC in a system of Embodiment 1.

FIG. 4 is a flowchart illustrating how the adapter 13 establishes a connection with the PLC 14. The procedure, as illustrated in FIG. 4, includes:

a step 401 of detecting whether a port and protocol have been set and in a case where a port and protocol have been set, proceeding to step 402 and otherwise proceeding to step 403, a step 402 of establishing a wired connection with the PLC on the basis of the port and protocol set, and a step 403 of selecting a protocol from a protocol list stored in advance, selecting a port from a port list stored in advance, selecting a port setting from a port setting list stored in advance, and establishing a wired connection with the PLC with use of the protocol, port, and port setting selected.

Table 1 shows an example protocol list. Table 2 shows an example port list. Table 3 shows an example port setting list.

TABLE 1

| Index | Communication protocol | Protocol macro index |
|---|---|---|
| 1 | Communication protocol 1 | Protocol macro entry |
| 2 | Communication protocol 2 | Protocol macro: entry |
| 3 | Communication protocol 3 | Protocol macro: entry |
| 4 | Communication protocol 4 | Protocol macro: entry |

TABLE 2

| Index | Port | Port setting applicable | Port setting list index |
|---|---|---|---|
| 1 | RS232 | Port setting: index serial | Setting index: entry |
| 2 | RS485 | Port setting: index serial | Setting index: entry |
| 3 | RS422 | Port setting: index serial | Setting index: entry |
| 4 | USB | Port setting: index serial | Setting index: entry |
| 5 | Ethernet | Port setting: index serial | Setting index: entry |

TABLE 3

| Index | Baud rate | Data length | Stop bit | Parity check |
|---|---|---|---|---|
| 1 | 9600 bps | 7 | 1 | None |
| 2 | 9600 bps | 7 | 1 | Odd |
| 3 | 9600 bps | 7 | 1 | Even |
| 4 | 9600 bps | 7 | 2 | None |
| 5 | 9600 bps | 7 | 2 | Odd |
| 6 | 9600 bps | 7 | 2 | Even |
| 7 | 9600 bps | 8 | 1 | None |
| 8 | 9600 bps | 8 | 1 | Odd |
| 9 | 9600 bps | 8 | 1 | Even |
| 10 | 9600 bps | 8 | 2 | None |
| 11 | 9600 bps | 8 | 2 | Odd |
| 12 | 9600 bps | 8 | 2 | Even |
| 13 | — | — | — | — |
| 14 | — | — | — | — |

The present embodiment may be arranged such that in a case where a connection between the adapter 13 and the PLC 14 has been successfully established, the adapter 13 obtains information on the state of the PLC 14 from the PLC 14 and transmits a packet of the information to the mobile terminal 12 to provide the information to the cloud server 11 via the mobile terminal 12. The adapter 13 may be configured to, when transmitting an information packet to the cloud server 11, attach a security key for the adapter 13 to the information packet. In a case where the cloud server has completed authentication, the cloud server 11 forwards, to the PLC 14 via the mobile terminal 12 and the adapter 13, data such as a corresponding program and/or parameter of the latest version.

Figure 5:
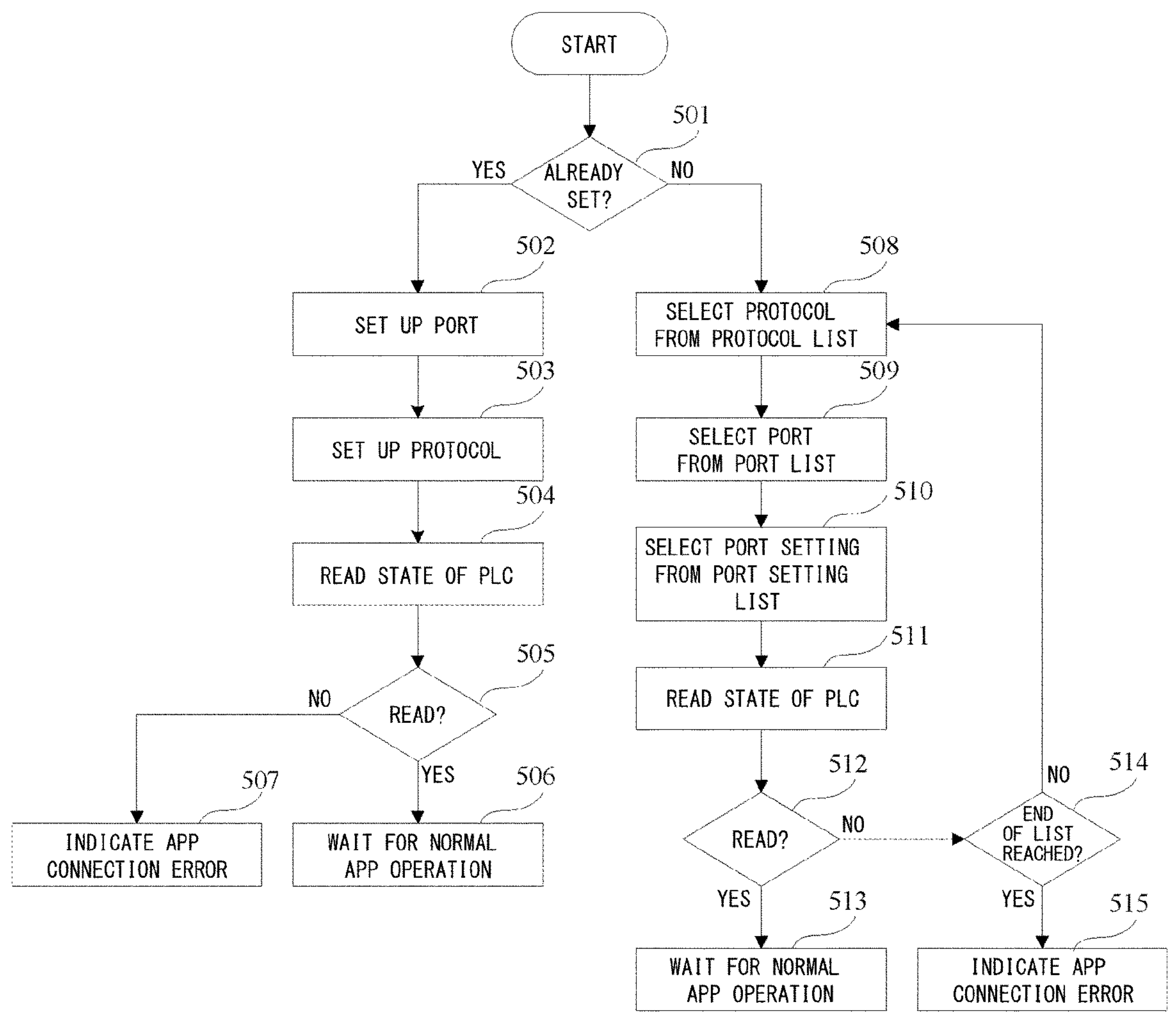
FIG. 5 is a flowchart illustrating how an adapter establishes a connection with a PLC and obtains data on the state of the PLC from the PLC in a system of Embodiment 1.
Figure 6:
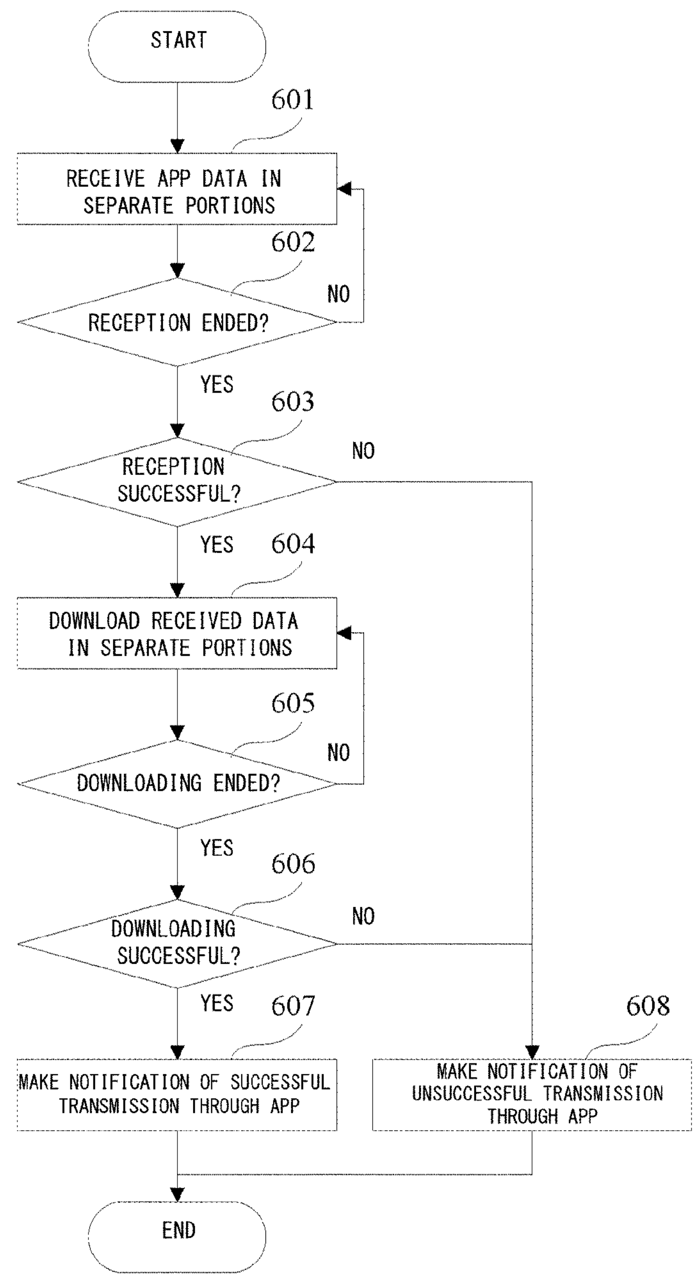
FIG. 6 is a flowchart illustrating how an adapter receives, from a mobile terminal, data from a cloud server in a system of Embodiment 1.

FIG. 5 is a flowchart illustrating how the adapter 13 establishes a connection with the PLC 14 and obtains information on the state of the PLC 14. FIG. 6 is a flowchart illustrating how the adapter 13 receives the program and/or parameter (hereinafter abbreviated to "data") from the cloud server 11.

As illustrated in FIG. 5, the procedure through which the adapter 13 establishes a connection with the PLC 14 includes:

a step 501 of determining whether a protocol and port have been set and in a case where the determination shows that a protocol and port have been set, proceeding to step 502 and otherwise proceeding to step 508, a step 502 of setting up a port, a step 503 of setting up a protocol, a step 504 of reading the state of the PLC, a step 505 of determining whether the state of the PLC has been read and in a case where the determination shows that the state of the PLC has been read, proceeding to step 506 and otherwise proceeding to step 507, a step 506 of waiting to receive data from the cloud server 11 as a result of a normal operation by an APP, a step 507 of indicating an APP connection error, a step 508 of selecting a protocol from a protocol list (see Table 1 for details of the protocol list), a step 509 of selecting a port from a port list (see Table 2 for details of the port list), a step 510 of selecting a port setting from a port setting list (see Table 3 for details of the port setting list), a step 511 of reading the state of the PLC, a step 512 of determining whether the state of the PLC has been read and in a case where the determination shows that the state of the PLC has been read, proceeding to step 513 and otherwise proceeding to step 514, a step 513 of waiting to receive data from the cloud server 11 as a result of a normal operation by an APP, a step 514 of determining whether the end of the list (that is, one of the above three lists) has been reached and in a case where the determination shows that the end of the list has been reached, proceeding to step 515 and otherwise returning to step 508, and a step 515 of indicating an APP connection error.

For the present embodiment, the order in which steps 508, 509, and 510 are carried out is not limited to any particular order.

As illustrated in FIG. 6, the procedure through which the adapter 13 receives data includes:

a step 601 of receiving, from the mobile terminal 12 in separate portions, data (hereinafter abbreviated to "APP data") downloaded from the cloud server 11, a step 602 of determining whether the reception has ended and in a case where the determination shows that the reception has ended, proceeding to step 603 and otherwise returning to step 601, a step 603 of determining whether the reception has been successful and in a case where the determination shows that the reception has been successful, proceeding to step 604 and otherwise proceeding to step 608, a step 604 of downloading the received data in separate portions, a step 605 of determining whether the downloading has ended and in a case where the determination shows that the downloading has ended, proceeding to step 606 and otherwise returning to step 604, a step 606 of determining whether the downloading has been successful and in a case where the determination shows that the downloading has been successful, proceeding to step 607 and otherwise proceeding to step 608, a step 607 of making a notification that transmission through the APP has been successful, and a step 608 of making a notification that transmission through the APP has been unsuccessful.

The present embodiment may be arranged as follows: The adapter 13 receives a data sampling request from the cloud server 11 via the mobile terminal 12, obtains corresponding data from the PLC 14 in response to the data sampling request, and uploads the data onto the cloud server 11 via the mobile terminal 12 for storage on the cloud server 11.

The present embodiment may be arranged as follows: The PLC 14 is, for example, a PLC included in a device control system such as a vehicle control system and a device control system for an electric charging pole or the like. The PLC 14 samples data in response to a request from the cloud server 11 and uploads sampled data such as monitoring data onto the cloud server 11 for an information item stored thereon in correspondence with the PLC. The PLC for the present embodiment does not need any modification from a conventional PLC.

The system of the present embodiment eliminates the need to handle programming software with use of a PLC or impart a networking function, a wireless communication function, or a memory card function to a low-cost PLC having only limited functions. This allows the operator to simply connect a mobile terminal to a network (install an APP or the like) and access the cloud server to update a program and/or parameter of a PLC and upload data such as monitoring data.

As compared to the form of local operation discussed as background art, the system of the present embodiment eliminates the need for the operator to have the ability to handle PLC programming software, and allows the operator to simply download from the cloud server a parameter and/or program in correspondence with the selected type of PLC to set a programming and parameter for the PLC. Now that mobile devices are in widespread use, the above configuration allows the user to easily use and operate data on the server for improved efficiency. The above configuration also makes it possible to rapidly update a parameter and/or program on-site for a PLC having no memory card.

Regarding the form of remote operation discussed as background art, while local PLC devices are provided in an extremely large number and do not have a networking function, the site is not so far. Thus, in a case where an operator can easily go to the site, the system of the present embodiment allows the operator to use a mobile terminal to connect to a network, obtain the latest program and/or parameter for each PLC device, and update the program and/or parameter of each of the numerous PLCs. Further, the above configuration, which allows a program and/or parameter to be transmitted through the cloud, allows the operator to, in order to solve an on-site problem, contact an engineer as appropriate about updating a program and/or parameter to a new version. Further, since the cloud stores all information such as an increase in the number of PLCs and a parameter change, the above configuration eliminates the need for a mobile terminal to store each corresponding client program and/or parameter. This means that any operator on site can obtain the latest data in real time and that no mobile terminal needs updating.

Embodiment 2

The present embodiment provides a method for transmitting a program and parameter to a programmable logic controller (PLC) which method is for use in an adapter. For an aspect of the method, reference may be made to the aspect of the adapter 13 described for Embodiment 1. Descriptions of similar elements are not repeated here.

Figure 7:
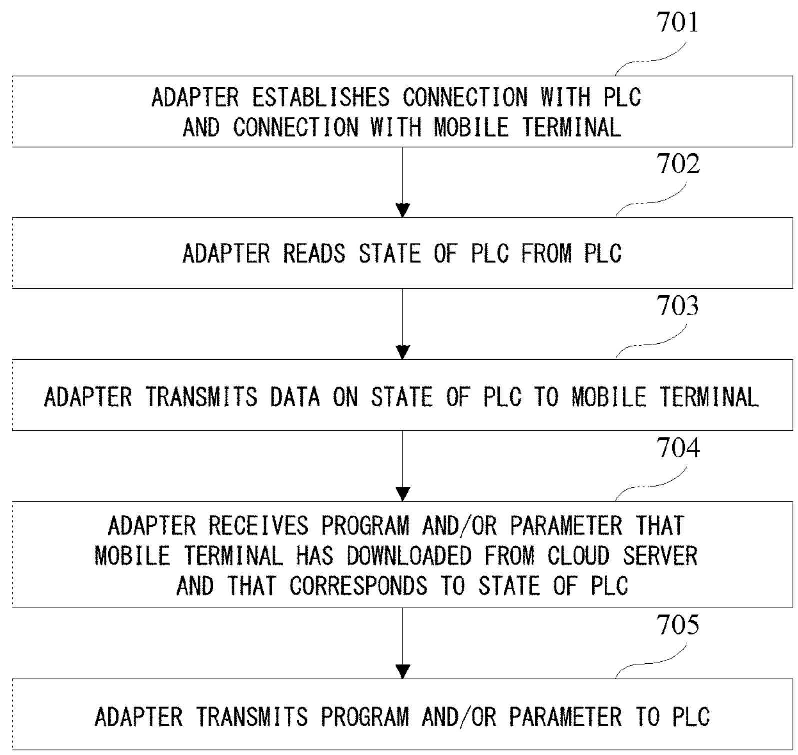
FIG. 7 is a flowchart illustrating a method of Embodiment 2 for transmitting a program and parameter to a PLC.

FIG. 7 is a flowchart illustrating the method. As illustrated in FIG. 7, the method includes:

a step 701 of an adapter establishing a connection with a PLC and a connection with a mobile terminal, a step 702 of the adapter reading the state of the PLC from the PLC, a step 703 of the adapter transmitting data on the state of the PLC to the mobile terminal, a step 704 of the adapter receiving a program and/or parameter that the mobile terminal has downloaded from a cloud server and that corresponds to the state of the PLC, and a step 705 of the adapter transmitting the program and/or parameter to the PLC.

Step 701 is not described here because FIG. 3 may be referred to about the procedure through which the adapter establishes a wireless connection with the mobile terminal, and FIG. 4 may be referred to about the procedure through which the adapter establishes a wired connection with the PLC.

The present embodiment may, as described above, be arranged as follows: The adapter receives a data sampling request from the cloud server via the mobile terminal, obtains corresponding data from the PLC in response to the data sampling request, and transmits the data onto the cloud server via the mobile terminal.

The present embodiment is, as described above, arranged such that the cloud server 11 stores (i) information on each registered user, (ii) information on PLCs to one of which each registered user corresponds, and (iii) programs to one of which each PLC corresponds, parameters to one of which each PLC corresponds, and/or pieces of uploaded monitoring data to one of which each PLC corresponds. This allows an operator to obtain, from the cloud server, a program and/or parameter for the PLC on the basis of the obtained information on the PLC for updating and maintenance of the PLC.

The method of the present embodiment eliminates the need to handle programming software with use of a PLC or impart a networking function, a wireless communication function, or a memory card function to a low-cost PLC having only limited functions. This allows the operator to simply connect a mobile terminal to a network (install an APP or the like) and access the cloud server to update a program and/or parameter of a PLC and upload data such as monitoring data.

Embodiment 3

The present embodiment provides an adapter that uses the method according to Embodiment 2. Elements of the present invention that are similar to those described for Embodiment 1 or 2 are not described here again.

Figure 8:
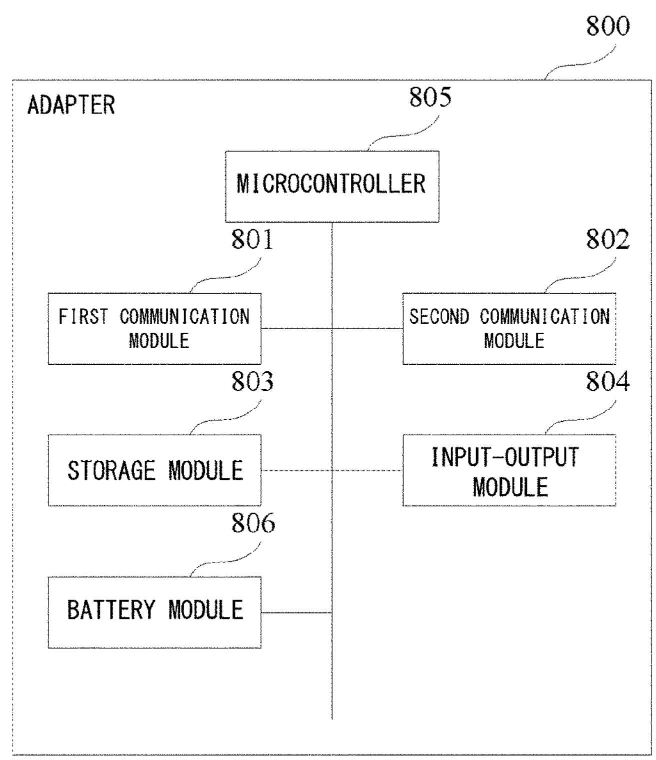
FIG. 8 is a diagram schematically illustrating an adapter of Embodiment 3.

FIG. 8 is a diagram schematically illustrating the adapter. As illustrated in FIG. 8, the adapter 800 includes a first communication module 801, a second communication module 802, a storage module 803, an input-output module 804, and a microcontroller 805.

The first communication module 801 is configured to establish a wired connection with a programmable logic controller (PLC). The second communication module 802 is configured to establish a wireless connection with a mobile terminal. The storage module 803 is configured to store in advance a protocol list, a port list, and a port setting list for establishment of a wired connection with the PLC. The input-output module 804 is configured to (i) receive an input from an external device to the adapter and (ii) output data to an external device. The microcontroller 805 is configured to control the first communication module 801, the second communication module 802, the storage module 803, and the input-output module 804. This control includes:

a task of controlling (i) the first communication module 801 so that the first communication module 801 establishes a connection with the PLC and (ii) the second communication module 802 so that the second communication module 802 establishes a connection with the mobile terminal, a task of controlling the first communication module 801 so that the first communication module 801 reads the state of the PLC from the PLC, a task of controlling the second communication module 802 so that the second communication module 802 transmits data on the state of the PLC to the mobile terminal, a task of controlling the second communication module 802 so that the second communication module 802 receives a program and/or parameter that the mobile terminal has downloaded from a cloud server and that corresponds to the state of the PLC, and a task of controlling the first communication module 801 so that the first communication module 801 transmits the program and/or parameter to the PLC.

As an alternative configuration, the adapter 800 may, as illustrated in FIG. 8, further include a battery module 806 configured to charge the adapter.

The present embodiment may be arranged such that the microcontroller 805 further controls the first communication module 801 so that the first communication module 801 establishes a wired connection with the PLC. This establishment of a wired connection includes: detecting whether a port and protocol have been set; in a case where a port and protocol have been set, establishing a wired connection with the PLC on the basis of the port and protocol set; and in a case where a port and protocol have not been set, selecting a protocol from the protocol list stored in advance in the storage module, selecting a port from the port list stored in advance in the storage module, selecting a port setting from the port setting list stored in advance in the storage module, and establishing a wired connection with the PLC with use of the protocol, port, and port setting selected.

The present embodiment may be arranged such that the microcontroller 805 further carries out: a task of controlling the second communication module 802 so that the second communication module 802 receives a data sampling request from the cloud server via the mobile terminal, a task of controlling the first communication module 801 in response to the data sampling request so that the first communication module 801 obtains corresponding data from the PLC, and a task of controlling the second communication module 802 so that the second communication module 802 transmits the data to the cloud server via the mobile terminal.

The adapter of the present embodiment eliminates the need to handle programming software with use of a PLC or impart a networking function, a wireless communication function, or a memory card function to a low-cost PLC having only limited functions. This allows the operator to simply connect a mobile terminal to a network (install an APP or the like) and access the cloud server to update a program and/or parameter of a PLC and upload data such as monitoring data.

The present invention has been described above on the basis of specific embodiments. The descriptions are, however, merely of examples, and do not limit the scope of protection sought for the present invention. A person skilled in the art will be able to alter and modify the present invention variously on the basis of its spirit and principle. Such alteration and modification are also within the scope of the present invention.

It should be noted that the particular embodiments of the present invention disclosed in detail in the descriptions above with reference to the drawings serve to show aspects with which the principle of the present invention is realizable and that embodiments of the present invention are not limited by the descriptions above. Embodiments of the present invention include various alterations and modifications within the spirit and matters of the attached claims as well as equivalents thereof.

A feature described or mentioned for an embodiment may be applied to one or more other embodiments by a similar or analogous method to be combined with or replace a feature of such other embodiments.

The word "include" as used herein is intended to mean the presence of a feature, part, step, or component. The word is not intended to exclude the presence or addition of one or more other features, parts, steps, or components.

The invention claimed is:

1. A method for transmitting a program and parameter to a programmable logic controller (PLC), the method being used in an adapter, the method comprising:

establishing, with the adapter, a connection with the PLC and a connection with a mobile terminal;

reading, with the adapter, a state of the PLC from the PLC;

transmitting, with the adapter, data on the state of the PLC to the mobile terminal;

receiving, with the adapter, a program or parameter that the mobile terminal has downloaded from a cloud server and that corresponds to the state of the PLC; and transmitting, with the adapter, the program or parameter to the PLC, wherein establishing of the connection with the PLC by the adapter comprises:

detecting whether a port and protocol have been set;

in a case where the port and protocol have been set, establishing a wired connection with the PLC on a basis of the port and protocol set; and in a case where the port and protocol have not been set, selecting a protocol from a protocol list stored in advance, selecting a port from a port list stored in advance, selecting a port setting from a port setting list stored in advance, and establishing a wired connection with the PLC with use of the protocol selected, the port selected, and the port setting selected.

2. The method according to claim 1, further comprising:

receiving, with the adapter, a data sampling request from the cloud server via the mobile terminal;

obtaining, with the adapter, corresponding data from the PLC in response to the data sampling request; and transmitting, with the adapter, the corresponding data to the cloud server via the mobile terminal.

3. The method according to claim 1, wherein the cloud server stores information on a plurality of registered users, information on a plurality of PLCs to one of which each of the plurality of registered users corresponds, and a plurality of programs to one of which each of the plurality of PLCs corresponds, a plurality of parameters to one of which each of the plurality of PLCs corresponds, or a plurality of pieces of uploaded monitoring data to one of which each of the plurality of PLCs corresponds.

4. An adapter, comprising:

a first communication module configured to establish a wired connection with a programmable logic controller (PLC);

a second communication module configured to establish a wireless connection with a mobile terminal;

a storage module configured to store in advance a protocol list, a port list, and a port setting list for establishment of the wired connection with the PLC;

an input-output module configured to receive an input from an external device to the adapter and output data to an external device; and a microcontroller configured with a program to control the first communication module, the second communication module, the storage module, and the input-output module, the controlling including:

a task of controlling the first communication module so that the first communication module establishes a connection with the PLC and the second communication module so that the second communication module establishes a connection with the mobile terminal, a task of controlling the first communication module so that the first communication module reads a state of the PLC from the PLC, a task of controlling the second communication module so that the second communication module transmits data on the state of the PLC to the mobile terminal, a task of controlling the second communication module so that the second communication module receives a program and/or parameter that the mobile terminal has downloaded from a cloud server and that corresponds to the state of the PLC, and a task of controlling the first communication module so that the first communication module transmits the program and/or parameter to the PLC.

5. The adapter according to claim 4, wherein the microcontroller is further configured with the program to control the first communication module so that the first communication module establishes the wired connection with the PLC, the establishing of the wired connection comprises:

detecting whether a port and protocol have been set;

in a case where the port and protocol have been set, establishing the wired connection with the PLC on a basis of the port and protocol set; and in a case where the port and protocol have not been set, selecting a protocol from the protocol list stored in advance in the storage module, selecting a port from the port list stored in advance in the storage module, selecting a port setting from the port setting list stored in advance in the storage module, and establishing the wired connection with the PLC with use of the protocol selected, the port selected, and the port setting selected.

6. The adapter according to claim 4, wherein the microcontroller is further configured with the program to carry out:

a task of controlling the second communication module so that the second communication module receives a data sampling request from the cloud server via the mobile terminal;

a task of controlling the first communication module in response to the data sampling request so that the first communication module obtains corresponding data from the PLC; and a task of controlling the second communication module so that the second communication module transmits the corresponding data to the cloud server via the mobile terminal.

7. A system, comprising:

a cloud server;

a mobile terminal;

an adapter; and a programmable logic controller (PLC), the system being configured to transmit a program and parameter to the PLC, the cloud server storing: information on a plurality of PLCs to one of which each of a plurality of registered users corresponds; and a plurality of programs to one of which each of the plurality of PLCs corresponds, a plurality of parameters to one of which each of the plurality of PLCs corresponds, or a plurality of pieces of uploaded monitoring data to one of which each of the plurality of PLCs corresponds, the mobile terminal being configured to connect to the cloud server over a wireless network and connect to the adapter over a near-field wireless network, and on a basis of a state of the PLC on which state data has been transmitted from the adapter, obtain, from the cloud server, a program or parameter corresponding to the state of the PLC, the adapter being configured to connect to the PLC over a wired network, read the state of the PLC from the PLC and transmit the data on the state of the PLC to the mobile terminal, and receive the program or parameter from the mobile terminal and transmit the program and/or parameter to the said PLC, wherein PLC is configured to sample data and transmit the sampled data to the cloud server via the adapter and the mobile terminal, the adapter is configured to establish a connection with the PLC by:

detecting whether a port and protocol have been set;

in a case where the port and protocol have been set, establishing a wired connection with the PLC on a basis of the port and protocol set; and in a case where the port and protocol have not been set, selecting a protocol from a protocol list stored in advance, selecting a port from a port list stored in advance, selecting a port setting from a port setting list stored in advance, and establishing a wired connection with the PLC with use of the protocol selected, the port selected, and the port setting selected.

8. The system according to claim 7, wherein the adapter is further configured to:

receive a data sampling request from the cloud server via the mobile terminal;

obtain corresponding data from the PLC in response to the data sampling request; and transmit the corresponding data to the cloud server via the mobile terminal.

* * * * *